(12) United States Patent
Masuda et al.

(10) Patent No.: US 8,301,360 B2
(45) Date of Patent: Oct. 30, 2012

(54) KNOCK DETERMINING DEVICE

(75) Inventors: Satoshi Masuda, Kariya (JP); Rihito Kaneko, Nishikamo-gun (JP); Satoshi Watanabe, Okazaki (JP); Hiroto Tanaka, Toyota (JP); Kenji Senda, Okazaki (JP); Norihito Hanai, Toyota (JP); Yasuhiro Yamasako, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 488 days.

(21) Appl. No.: 12/672,731

(22) PCT Filed: Jul. 23, 2008

(86) PCT No.: PCT/JP2008/063626
§ 371 (c)(1),
(2), (4) Date: Feb. 9, 2010

(87) PCT Pub. No.: WO2009/020016
PCT Pub. Date: Feb. 12, 2009

(65) Prior Publication Data
US 2011/0257872 A1    Oct. 20, 2011

(30) Foreign Application Priority Data
Aug. 8, 2007   (JP) .................................. 2007-206378

(51) Int. Cl.
G01L 23/22   (2006.01)
F02D 45/00   (2006.01)
G01M 15/12   (2006.01)
F02P 5/152   (2006.01)

(52) U.S. Cl. ...................................................... 701/111

(58) Field of Classification Search .................. 701/111, 701/101, 102; 123/406.33, 406.35, 406.38
See application file for complete search history.

(56) References Cited

U.S. PATENT DOCUMENTS
3,950,981 A   4/1976   Arrigoni et al.
4,279,143 A   7/1981   Guipaud
(Continued)

FOREIGN PATENT DOCUMENTS
EP   0 454 486   10/1991
(Continued)

OTHER PUBLICATIONS

Japanese Office Action dated Aug. 4, 2011, issued in corresponding Japanese Application No. 2007-206378 with English translation.

(Continued)

Primary Examiner — Hieu T Vo
(74) Attorney, Agent, or Firm — Nixon & Vanderhye PC

(57) ABSTRACT

An output signal of a knock sensor is filtered with a plurality of band-pass filters to extract vibration waveform components of a plurality of frequency bands (f1-f4). Weighting coefficients (G1-G4) which multiply the vibration waveform component of each frequency band are established in such a manner as to be a small value as a noise intensity of each frequency band becomes larger. Thereby, the vibration waveform component of a plurality of frequency bands is synthesized by weighting according to an influence of a noise intensity of each frequency band. Even when the noise is superimposed on the vibration waveform component of any of the frequency bands, it becomes possible to reduce the influence of the noise and to synthesize the vibration waveform component of each frequency band, and an accurate knock determination can be performed based on the composite vibration waveform.

5 Claims, 6 Drawing Sheets

U.S. PATENT DOCUMENTS

| | | | |
|---|---|---|---|
| 4,345,558 A * | 8/1982 | Yamaguchi et al. | 123/406.35 |
| 4,424,706 A * | 1/1984 | Oh | 123/406.38 |
| 4,637,245 A * | 1/1987 | Iwata et al. | 73/35.03 |
| 4,640,250 A | 2/1987 | Hosaka et al. | |
| 5,230,316 A | 7/1993 | Ichihara et al. | |
| 5,608,633 A | 3/1997 | Okada et al. | |
| 6,520,149 B2 | 2/2003 | Kokubo et al. | |
| 7,181,338 B2 | 2/2007 | Takemura et al. | |
| 7,243,529 B2 * | 7/2007 | Takemura et al. | 73/35.09 |
| 2004/0260453 A1 | 12/2004 | Sauler et al. | |
| 2006/0128304 A1 | 6/2006 | Ramaswamy et al. | |
| 2007/0012090 A1 | 1/2007 | Yoshihara et al. | |
| 2010/0162794 A1 | 7/2010 | Kaneko et al. | |

FOREIGN PATENT DOCUMENTS

| | | |
|---|---|---|
| JP | 04-008850 | 1/1992 |
| JP | 05-079441 | 3/1993 |
| JP | 2006-299995 | 11/2006 |
| JP | 2006-336604 | 12/2006 |
| SU | 1740764 | 6/1992 |

OTHER PUBLICATIONS

Chinese Office Action dated Jun. 24, 2011, issued in corresponding Chinese Application No. 20880101840.X with English translation.
Chinese Office Action dated Apr. 27, 2012, issued in corresponding Chinese Application No. 20880101840.X with English translation.
Korean Office Action dated Nov. 23, 2011, issued in corresponding Korean Application No. 10-2010-7002552 with English Translation.
Chinese Office Action dated Dec. 9, 2011, issued in corresponding Chinese Application No. 200880101840.X.
International Search Report for PCT/JP2008/063626, mailed Sep. 26, 2008.
Written Opinion of the International Searching Authority for PCT/JP2008/063626, mailed Sep. 26, 2008.
International Preliminary Report on Patentability for PCT/JP2008/063626, mailed Oct. 9, 2009.
Japanese Office Action dated Apr. 6, 2011, issued in corresponding Japanese Application No. 2007-206378, with English translation.
Russian Decision on Grant dated Apr. 4, 2011, issued in corresponding Russian Application No. 2010108289 with English Translation.

* cited by examiner

KNOCK DETERMINING DEVICE

This application is the U.S. national phase of International Application No. PCT/JP2008/063626 filed 23 Jul. 2008, which designated the U.S. and claims priority to Japanese Patent Application No. 2007-206378 filed Aug. 8, 2007, the disclosure of each of which is incorporated herein by reference.

CROSS-REFERENCE TO RELATED APPLICATION

This application is based on Japanese Patent Application No. 2007-206378 filed on Aug. 8, 2007, the disclosure of which is incorporated herein by reference.

TECHNICAL FIELD

The present invention relates to a knock determining device which extracts vibration waveform components of a plurality of frequency band from an output of the vibration waveform detecting means which detects a knocking vibration of the internal combustion engine in order to determine whether a knock exists.

BACKGROUND ART

Recently, an internal combustion engine for an automobile is provided with a variable valve mechanism such as a variable valve timing mechanism, and a direct injection engine varies a fuel injection timing according to a combustion mode in order to achieve high output, low fuel consumption, and low emission. Valve seating noises of intake/exhaust valves and driving noise of a fuel injector are superimposed on an output signal of a knock sensor which detects knocking vibration. Since arising timing of these noises varies according to a control condition of the internal combustion engine, it is difficult to distinguish the knock from these noises.

As shown in JP-2007-9814A (US-2007/0012090A1), vibration waveform components of a plurality of frequency bands where waveforms peculiar to knocking vibration arise are extracted from the output signal of the knock sensor by a plurality of band-pass filters. These vibration waveform components of the plurality of frequency bands are synthesized. Based on the composite vibration waveforms, it is determined whether a knock exists.

As described above, since a timing at which the noise is superimposed on the output signal of the knock sensor is varied according to the control condition of the engine, even if the vibration waveform components of a plurality of the frequency bands where waveforms peculiar to knocking vibration arise are extracted from the output signal of the knock sensor in a knock determination range (a crank angle range from TDC in a power stroke to ATDC 90°CA), the noise may be superimposed on any of the vibration waveform components of the plurality of the frequency bands, which are extracted in the knock determination range.

Since the vibration waveform components of a plurality of frequency bands which are extracted from the output signal of the knock sensor are simply synthesized, if a noise is superimposed on the vibration waveform component of any frequency bands, the noise is superimposed on the composite vibration waveform as it is, which make difficult to distinguish the knock from the noise.

JP-2006-169996A (U.S. Pat. No. 7,181,338B2) shows a countermeasure in which it is determined whether a noise exists every frequency band, and when a noise is detected in any frequency bands, the knock determination is prohibited. However, if the knock determination is prohibited when a knock actually occurs, such a knock cannot be detected.

DISCLOSURE OF THE INVENTION

The present invention is made in view of the above matters, and it is an object of the present invention to provide a knock determining device for an internal combustion engine, which can reduce an influence of a noise and perform an accurate knock determination even if a noise is superimposed on any of vibration waveform components of a plurality of frequency bands which are extracted from the output signals of a vibration waveform detecting means, such as a knock sensor.

In order to achieve the above-mentioned object, according to the present invention, a knock determining device for an internal combustion engine includes: a vibration waveform detecting means for outputting a vibration waveform signal according to a knocking vibration of the internal combustion; a filter means for extracting vibration waveform components of a plurality of frequency bands from the vibration waveform signal of the vibration waveform detecting means; a noise intensity determination means for determining an intensity of noise which is superimposed on the vibration waveform components with respect to each frequency band; a synthesize means for synthesizing the vibration waveform components of the plurality of the frequency bands so that a composite vibration waveform is generated; and a knock determination means for performing a knock determination based on the composite vibration waveform.

The vibration waveform component of a plurality of frequency bands is synthesized by weighting according to the degree of influence of the noise intensity of each frequency band.

According to the present invention, since the vibration waveform components of each frequency bands are synthesized by weighting according to the degree of influence of the noise intensity of each frequency band. Even if the noise is superimposed on the vibration waveform components of any of the frequency bands, the vibration waveform components of each frequency band can be synthesized reducing the degree of influence of the noise and an accurate knock determination can be performed based on the composite vibration waveform.

BEST MODES FOR CARRYING OUT THE INVENTION

An embodiment of the present invention will be described hereinafter.

Figure 1:
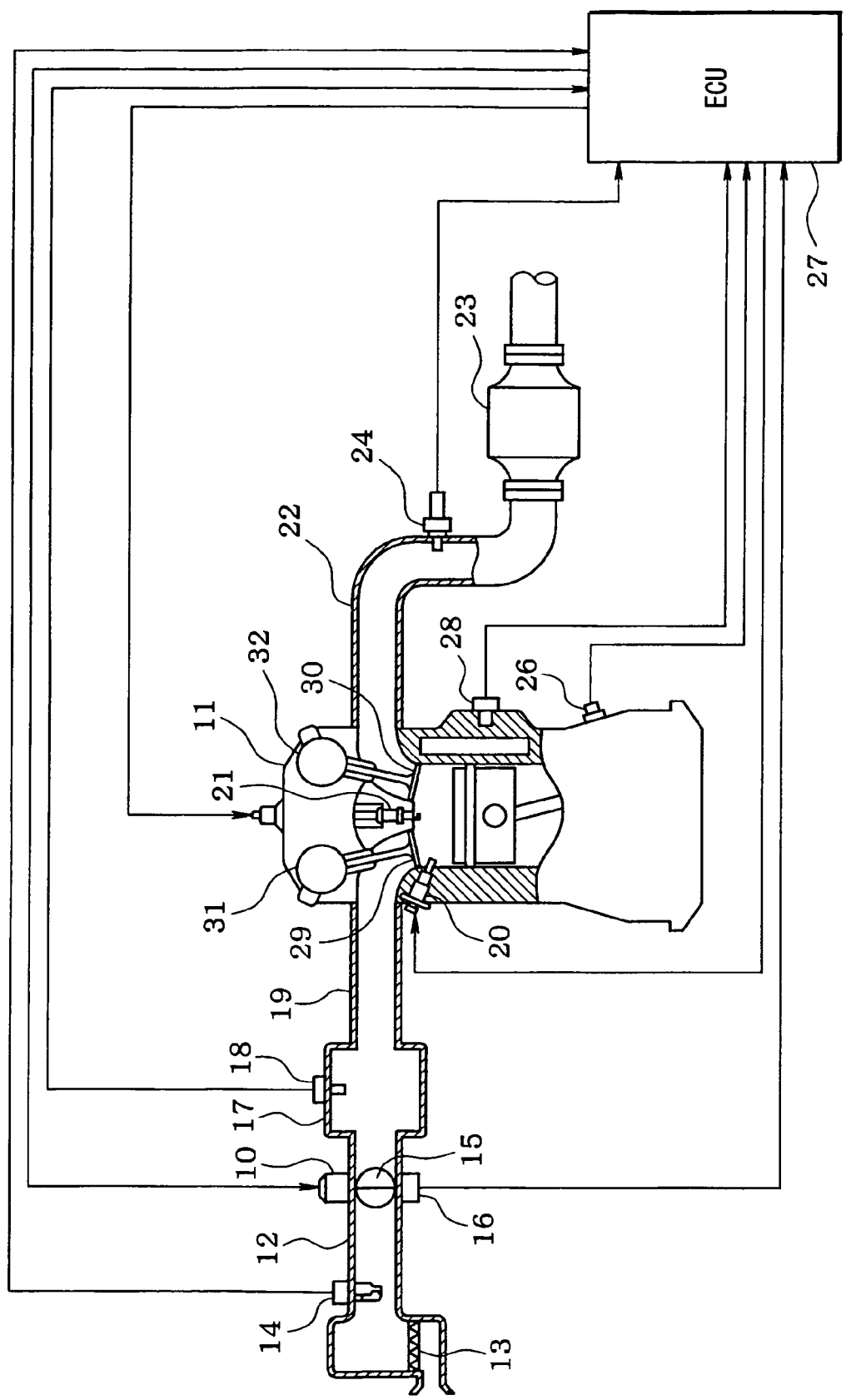
FIG. 1 is a schematic view of an engine control system according to an embodiment of the present invention.

Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 15 driven by a motor 10 and a throttle position sensor 16 detecting a throttle position are provided downstream of the air flow meter 14.

A surge tank 17 including an intake air pressure sensor 18 is provided downstream of the throttle valve 15. The intake air pressure sensor 18 detects intake air pressure. An intake manifold 19 is connected to the surge tank 17. A fuel injector 20 is mounted on each cylinder for injecting fuel into an interior of the cylinder respectively. A spark plug 21 is mounted on a cylinder head of the engine 11 corresponding to each cylinder to ignite air-fuel mixture in each cylinder.

The engine 11 is provided with an intake valve timing controller 31 which adjusts valve timing of the intake valve 29, and an exhaust valve timing controller 32 which adjusts valve timing of an exhaust valve 30.

An exhaust pipe 22 of the engine 11 is provided with a three-way catalyst 23 purifying CO, HC, NOx and the like in the exhaust gas. An exhaust gas sensor 24 detecting air-fuel ratio or rich/lean of the exhaust gas is disposed upstream of the three-way catalyst 23. A knock sensor 28 (vibration waveform detecting means) detecting a knocking vibration and a crank angle senor 26 outputting a pulse signal every predetermined crank angle of a crankshaft of the engine 11 are disposed on a cylinder block of the engine 11. The crank angle and an engine speed are detected based on the output signal of the crank angle sensor 26.

The outputs from the above sensors are inputted into an electronic control unit 27, which is referred to an ECU hereinafter. The ECU 27 includes a microcomputer which executes an engine control program stored in a Read Only Memory (ROM) to control a fuel injection quantity of the fuel injector 20 and an ignition timing of the spark plug 21.

Figure 2:
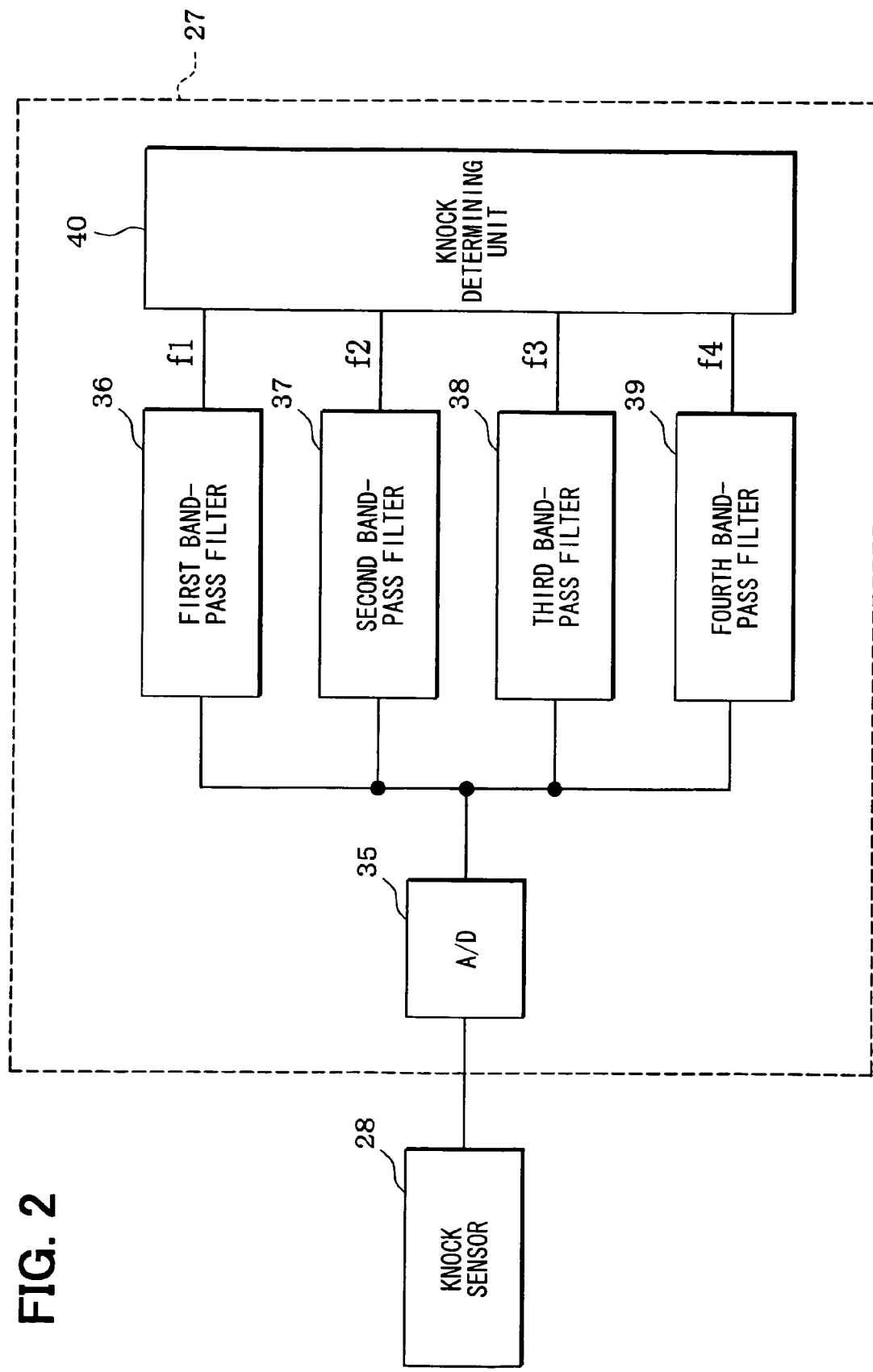
FIG. 2 is a block diagram showing a circuit which treats output signals of a knock sensor.

As shown in FIG. 2, the ECU 27 includes an A/D converter 35, first to fourth band-pass filters 36-39 (filter means), and a knock determining unit 40 (knock determining means). The A/D converter 35 converts vibration waveform signals outputted from the knock sensor 28 into digital values. The first to fourth band-pass filters 36-39 extract vibration waveform components of four frequency bands f1-f4 from the output signals of the A/D converter 35. The knock determining unit 40 synthesizes the vibration waveform components of four frequency bands f1-f4 and determines whether the knock exists based on a composite vibration waveform.

The frequency bands which the first to fourth band-pass filters 36-39 extract are comprised of a first order frequency band f1 (basic frequency band of the knocking vibration) and a second to fourth order frequency bands f2-f4. The first order frequency band f1 (frequency band-passing through the first band-pass filter 36) is established to include a basic frequency which is lowest frequency in the knocking vibration frequency (first order resonance frequency depending on a cylinder bore, for example, about 7.5 kH). The second to fourth order frequency bands f2-f4 (frequency bands passing through the second to fourth band-pass filters 37-39) are established to include a second to fourth order resonance frequencies (for example, about 12 kH, 17 kH, 21 kH).

Figure 4:
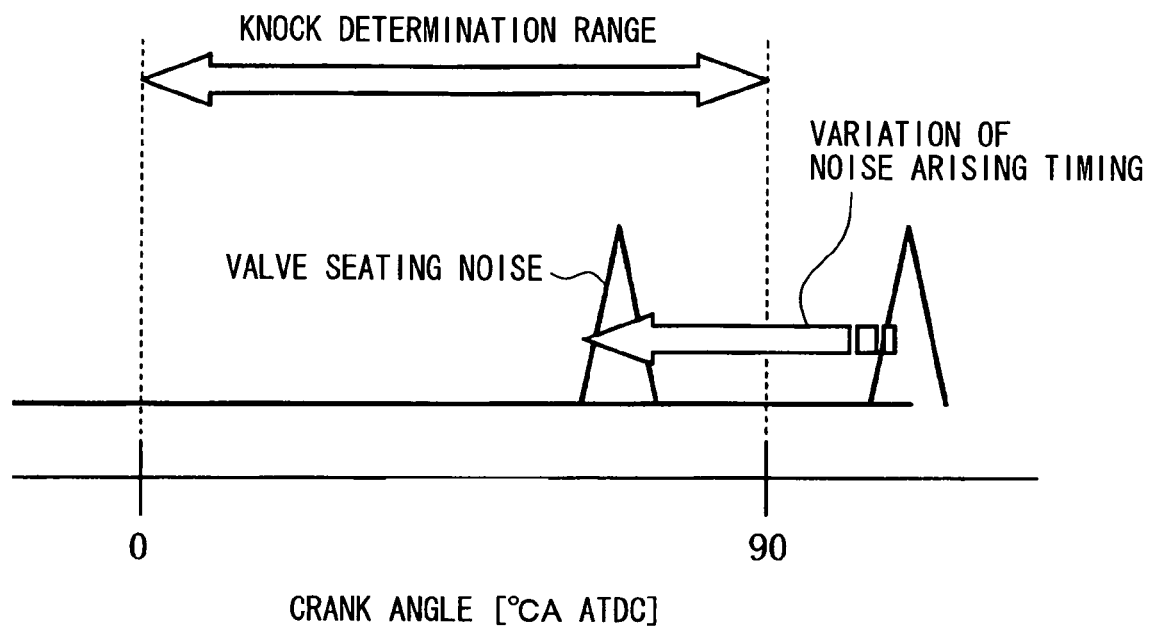
FIG. 4 is a chart for explaining a relation between the knock determination range and a valve seating noise.
Figure 5:
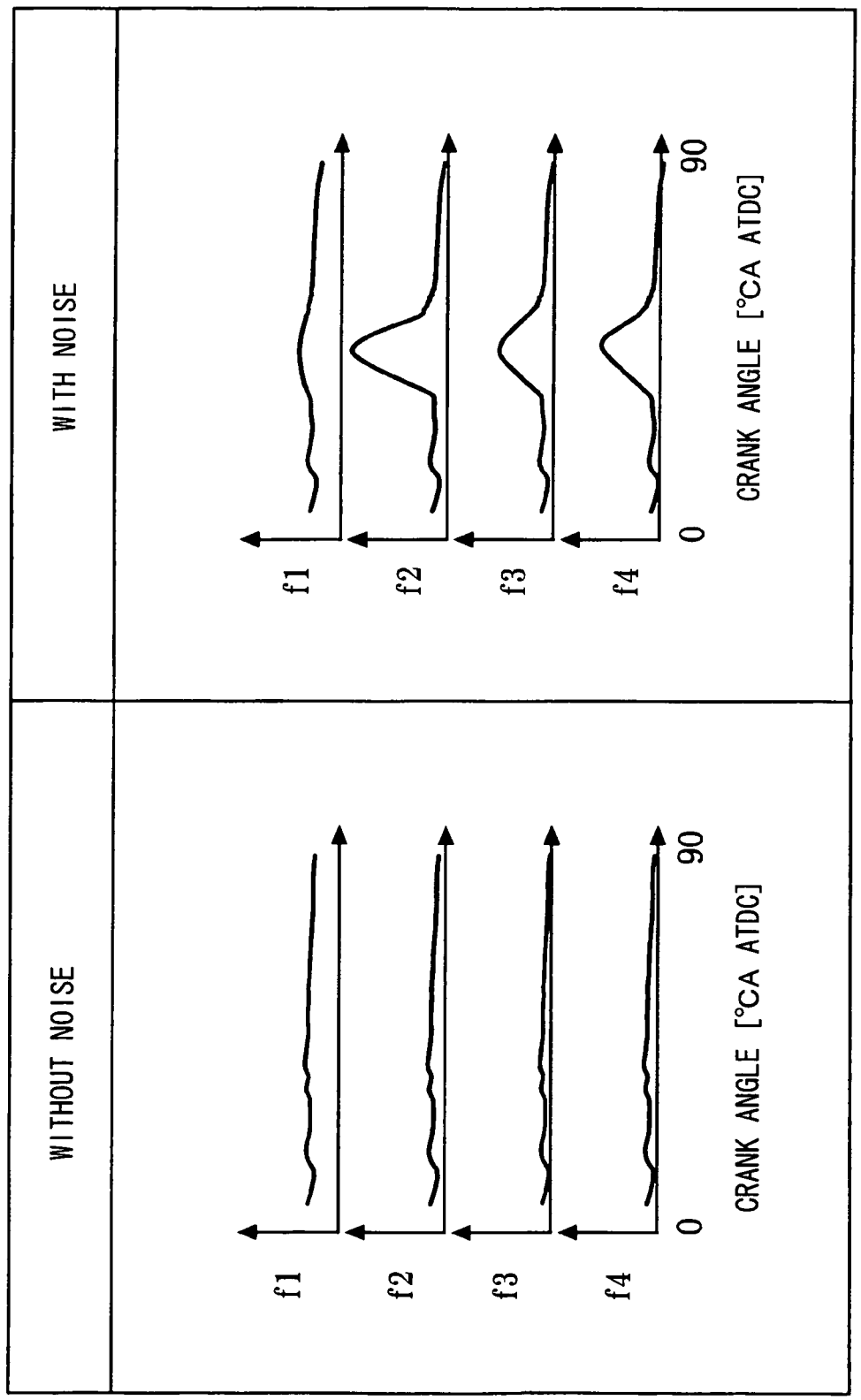
FIG. 5 is a chart showing waveforms in which a noise is superimposed on vibration waveform components of a first to fourth order frequency bands f1-f4 which are extracted from a sensor output signal of the knock sensor, and waveforms in which no noise is superimposed on the vibration waveform components.

In this embodiment, a knock determination range in which the vibration waveform components of the first to fourth order frequency bands f1-f4 are extracted from the output signals of the knock sensor 28 are established in a crank angle range from TDC (top dead center) in a power stroke to ATDC90°CA. A valve seating noise of the intake/exhaust valves 29, 30 and a driving noise of the fuel injector 20, which are superimposed on the output signals of the knock sensor 28, vary generating time thereof according to a control condition of the engine 11 (refer to FIG. 4). Hence, even if the vibration waveform components of a plurality of frequency bands in which a waveform peculiar to the knocking vibration is generated are extracted from the output signals of the knock sensor 28, the noise may be superimposed on some of the vibration waveform components of the first to fourth order frequency bands f1-f4 which are extracted in the knock determination range, as shown in FIG. 5.

In a conventional knock determination method, the vibration waveform components of the first to fourth order frequency bands f1-f4 are simply synthesized. If the noise is superimposed on some of the vibration waveform components of the frequency bands, the noise is superimposed on the composite vibration waveform as it is, which may difficult to distinguish the knock from the noise.

Figure 3:
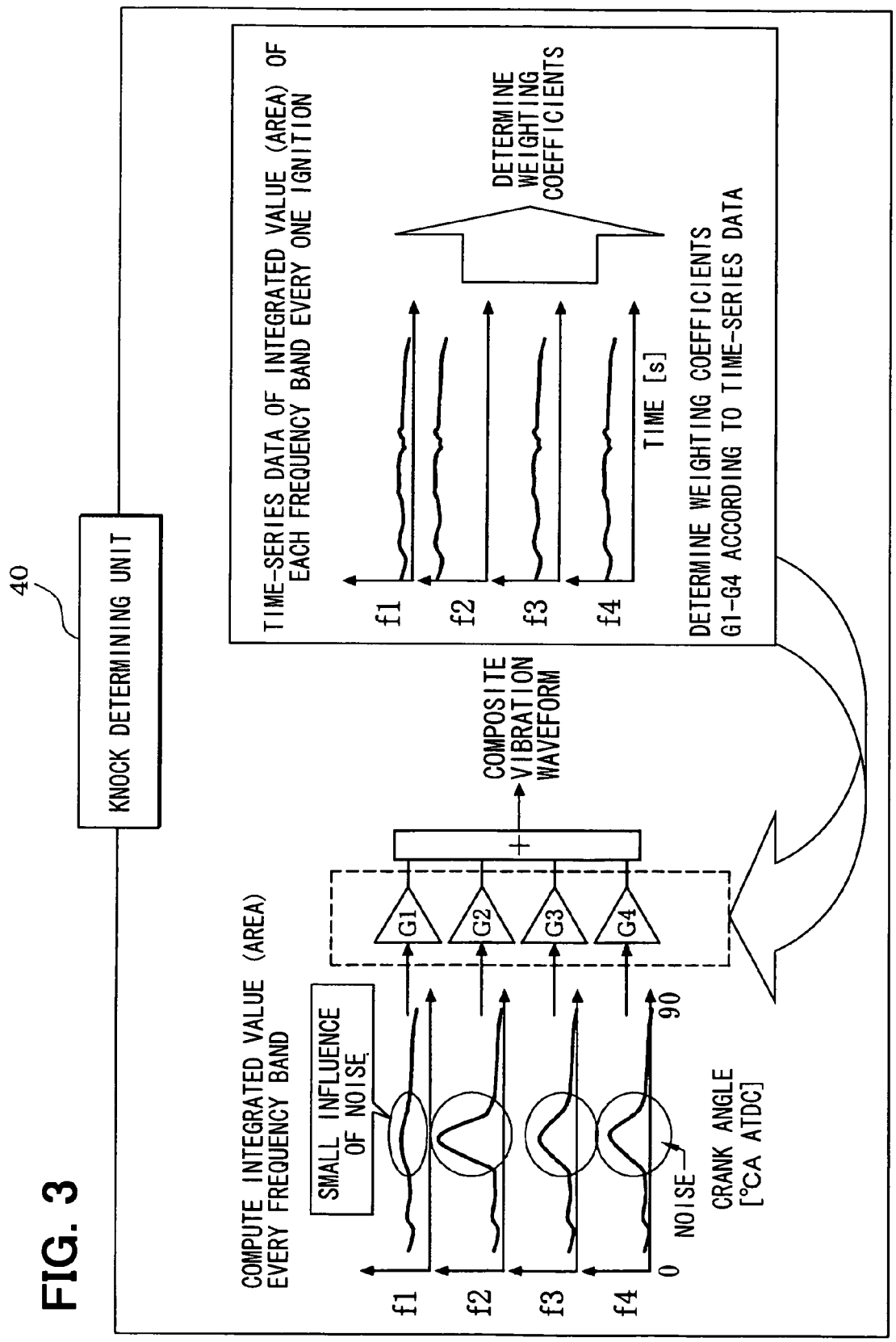
FIG. 3 is a chart for explaining a function of a knock determining unit.

In this embodiment, as shown in FIG. 3, the knock determining unit 40 functions as a noise intensity determining means which determines an intensity of the noise that is superimposed on the vibration waveform components of the first to fourth order frequency bands f1-f4 which are extracted by the first to fourth band-pass filters 36-39. The knock determining unit 40 functions also as a synthesize means which synthesizes the vibration waveform components of the first to fourth order frequency bands f1-f4 by weighting according to an influence due to the noise intensity of each frequency band so that the composite vibration waveform is generated. Specifically, in synthesizing the vibration waveform components of the first to fourth order frequency bands f1-f4, weighting coefficients G1-G4 which multiply the vibration waveform component of each frequency band f1-f4 is made smaller as the noise intensity of each frequency band f1-f4 increases.

A determination of the noise intensity of each frequency band f1-f4 may be performed according to one of following methods.

[Noise Intensity Determination Method (1)]

With respect to each ignition in each cylinder, the vibration waveform components of the first to fourth order frequency bands f1-f4 which are extracted from the output signal of the knock sensor 28 in the knock determination range are integrated. The integrated value (area) is stored in a memory of the ECU 27. With this, as shown in FIG. 3, time-series data of integrated value of the vibration waveform components of each frequency band f1-f4 every one ignition is prepared. These time-series data are utilized as indexes indicative of the noise intensity of each frequency band f1-f4.

[Noise Intensity Determination Method (2)]

Generating timing of the noise (for example, driving noise of the fuel injector 20, or valve seating noise of the intake/exhaust valves) is estimated based on a target advance value of a variable valve timing control or a target fuel injection timing so that the crank angle range in which the noise is generated is defined as a noise intensity determination range. The vibration waveform components of the first to fourth order frequency bands f1-f4 which are extracted from the output signals of the knock sensor 28 in the noise intensity determination range are respectively integrated. The integrated values (area) are utilized as indexes indicative of the noise intensity.

[Noise Intensity Determination Method (3)]

In a range other than the knock determination range, a range where a noise tends to be generated is defined as a noise intensity determination range. The vibration waveform components of the first to fourth order frequency bands f1-f4 which are extracted from the output signals of the knock sensor 28 in the noise intensity determination range are respectively integrated. The integrated values (area) are utilized as indexes indicative of the noise intensity.

[Noise Intensity Determination Method (4)]

With respect to the vibration waveform components of the first to fourth order frequency bands f1-f4 which are extracted from the output signal of the knock sensor 28 in the knock determination range in each ignition, a peak value is extracted as a parameter indicative of a characteristic of the noise (for example, driving noise of the fuel injector 20, or valve seating noise of the intake/exhaust valves). An average and a variance of the peak value are computed. The maximum average is selected as an average which is common to all frequency bands f1-f4. The noise intensity is determined based on a ratio between the variance and the maximum average with respect to each frequency band. A form correlation coefficient which represents correlation between the output waveform of the knock sensor 28 and an ideal knock waveform peculiar to the knock can be used as the parameter indicative of the characteristic of the noise in stead of the peak value.

Figure 6:
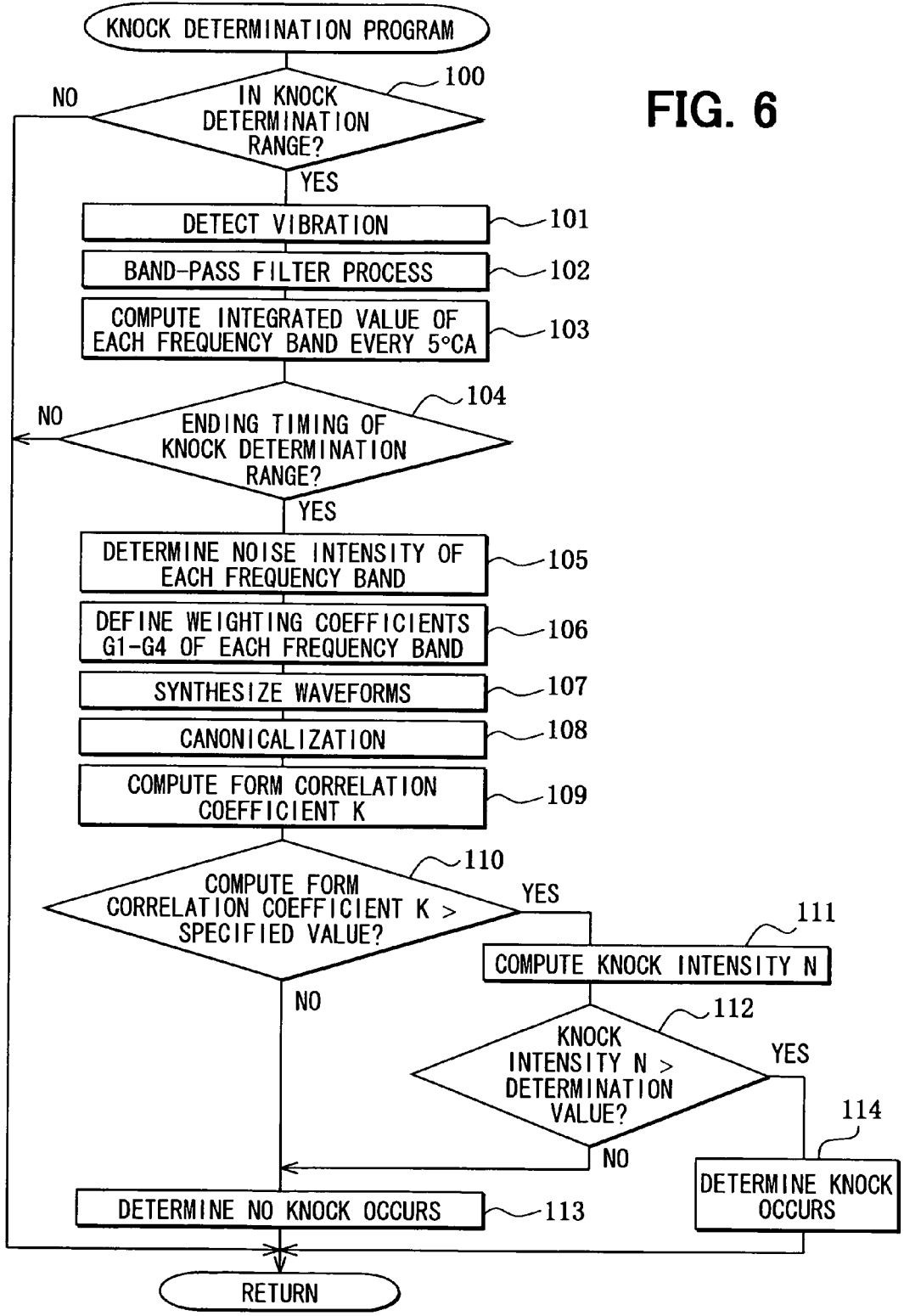
FIG. 6 is a flowchart showing a process of a knock determination program.

The knock determination described above is performed according to a knock determination program shown in FIG. 6, which is executed by the knock determining unit 40 of the ECU 27.

The knock determination program shown in FIG. 6 is executed in an output sampling period of the knock sensor 28 while the ECU 27 is energized. In step 100, the computer determines whether it is in the knock determination range (from TDC in power stroke to ATDC90°CA). When it is not in the knock determination range, the program is terminated. When it is in the knock determination range, the procedure proceeds to step 101 in which the output signal of the knock sensor 28 is ND-converted by the ND converter 35 and the vibration of the cylinder block of the engine 11 is detected.

Then, the procedure proceeds to step 102 in which the ND-converted value of the output signal of the knock sensor 28 is filtered through the first to fourth band-pass filters 36-39 to extract the vibration waveform components of the first to fourth order frequency bands f1-f4. In step 103, the vibration waveform components of each frequency band f1-f4 are respectively integrated. The integrated value every specified crank angle (for example, 5°CA) is stored in the memory of the ECU 27.

Then, the procedure proceeds to step 104 in which the computer determines whether it is an ending timing of the knock determination range. When it is not the ending timing of the knock determination range, the program is terminated. Thereby, until the ending timing, the integrated value of each frequency band f1-f4 every specified crank angle is repeatedly computed.

Then, at the time of ending timing of the knock determination range, the procedure proceeds to step 105 in which the noise intensity of each frequency f1-f4 is determined according to any one of methods described above. In step 106, the weighting coefficients G1-G4 of each frequency band f1-f4 which are used for synthesizing the integrated values of each frequency band f1-f4 every specified crank angle are defined in such a manner as to be smaller value as the noise intensity becomes larger.

Then, the procedure proceeds to step 107 in which the integrated values of each frequency band f1-f4 every specified crank angle (5°CA) are multiplied by the weighting coefficients G1-G4 to be synthesized, so that the composite vibration waveform is obtained every specified crank angle.

$$\text{Composite Vibration Waveform} = f1 \times G1 + f2 \times G2 + f3 \times G3 + f4 \times G4$$

In step 108, the composite vibration waveform (integrated value) every specified crank angle is canonicalized. The canonicalization represents that the composite vibration waveform (integrated value) is divided by a peak value P so that the vibration intensity is represented by a dimensionless number (for example, dimensionless number 0-1). The peak value P is a maximum value of the integrated value of the composite vibration waveform. The detected composite vibration waveform can be compared with the pre-stored ideal knock waveform (vibration waveform peculiar to the knock) without respect to the vibration intensity by the canonicalization. Thus, it is unnecessary to store a plurality of ideal waveform corresponding to vibration intensity, whereby the ideal knock waveform is easily prepared.

Then, the procedure proceeds to step 109 in which the form correlation coefficient which represents a coincidence between the canonicalized composite vibration waveform and the ideal knock waveform is computed as follows. A timing (peak position) at which a level of the canonicalized composite vibration waveform becomes maximum is brought to be coincident with a timing at which the vibration intensity of the ideal knock waveform becomes maximum. An absolute value $\Delta S(I)$ of a difference between the composite vibration waveform and the ideal knock waveform is computed every specified crank angle (for example, 5°CA).

Then, based on a summation $\Sigma \Delta S(I)$ of the absolute value $\Delta S(I)$ and an integrated value S of the ideal knock waveform, the form correlation coefficient K is computed according to the following equation.

$$K = \{S - \Sigma \Delta S(I)\}/S$$

Thereby, the coincidence (similarity) between the canonicalized composite vibration waveform and the ideal knock waveform is numerically expressed to determine the vibration objectively. By comparing the composite vibration waveform and the ideal knock waveform, it can be analyzed whether it is a knock vibration based on a vibration behavior, such as an attenuation tendency of the vibration.

Then, the procedure proceeds to step 110 in which the form correlation coefficient K is larger than a specified value. When the computer determines that the form correlation coefficient K is smaller that or equal to the specified value (that is, the coincidence between the composite vibration waveform and the ideal knock waveform in the knock determination range is low) in step 110, the procedure proceeds to step 113 in which the computer determines no knock occurs to advance the ignition timing.

When the computer determines that the form correlation coefficient K is greater than the specified value (that is, the coincidence between the composite vibration waveform and the ideal knock waveform in the knock determination range is high) in step 110, the procedure proceeds to step 111 in which the knock intensity N is computed by use of the peak value P of the composite vibration waveform integrated value every specified crank angle, the form correlation coefficient K, and a background level BGL.

$$N = P \times K / BGL$$

In the above equation, the background level BGL represents the vibration intensity of the engine 11 in a situation that no knock occurs. Thereby, it can be circumstantially analyzed whether the vibration of the engine 11 is caused by the knock based on the coincidence degree between the composite vibration waveform and the ideal knock waveform, and the vibration intensity.

Then, the procedure proceeds to step 112 in which the knock intensity N is greater than the knock determination value. When the knock intensity N is less than or equal to the knock determination value, the procedure proceeds to step 113 in which the computer determines that no knock occurs to advance the ignition timing.

When the computer determines that the knock intensity N is greater than the knock determination value, the procedure proceeds to step 114 in which the computer determines that the knock occurs to retard the ignition timing. Thereby, an occurrence of knock is restricted.

According to the present embodiment, the output signal of the knock sensor 28 is filtered through the first to fourth band-pass filters 36-39 to extract the vibration waveform components of the first to fourth order frequency bands f1-f4. Since the vibration waveform components of each frequency bands f1-f4 are synthesized by weighting according to the degree of incidence of the noise intensity of each frequency band f1-f4, even if the noise is superimposed on the vibration waveform components of any of the frequency bands, the vibration waveform components of each frequency band f1-f4 can be synthesized reducing the influence of the noise and an accurate knock determination can be performed based on the composite vibration waveform.

Furthermore, according to the present embodiment, in synthesizing the vibration waveform components of the first to fourth order frequency bands f1-f4, the weighting coefficients G1-G4 which multiply the vibration waveform component of each frequency band f1-f4 are made smaller as the noise intensity of each frequency band f1-f4 increases. Hence, the influence of the noise intensity of each frequency band f1-f4 can be reduced to substantially the same level by weighting, and an appropriate weighting can be performed according to the noise intensity of each frequency band f1-f4.

In the present embodiment, the vibration waveform components of four frequency bands f1-f4 are extracted from the output signal of the knock sensor 28. Alternatively, the vibration waveform components of three or less frequency bands or five or more frequency bands can be extracted.

The present invention is not limited to the direct injection engine as shown in FIG. 1, but can be applied also to an intake-port injection engine. The present invention can be applied to an engine which is provided with a variable valve controller such as a variable valve timing controller. The present invention may be implemented in other ways without departing from the spirit of the invention.

The invention claimed is:

1. A knock determining device for an internal combustion engine comprising:
   a vibration waveform detecting means for outputting a vibration waveform signal according to a knocking vibration of the internal combustion;
   a filter means for extracting vibration waveform components of a plurality of frequency bands from the vibration waveform signal of the vibration waveform detecting means;
   a noise intensity determination means for determining an intensity of noise which is superimposed on the vibration waveform components with respect to each frequency band;
   a synthesize means for synthesizing the vibration waveform components of the plurality of the frequency bands by weighting according to a degree of influence of the nose intensity of each frequency band so that a composite vibration waveform is generated; and
   a knock determination means for performing a knock determination based on the composite vibration waveform.

2. A knock determining device for an internal combustion engine according to claim 1, wherein
   the synthesize means synthesizes the vibration waveform components of the plurality of the frequency bands by smaller weighting as the noise intensity of each frequency band becomes larger.

3. A knock determining device for an internal combustion engine according to claim 1, wherein
   the noise intensity determination means determines the noise intensity of each frequency bands based on the vibration waveform components of each frequency band which the filter means extracts in a noise intensity determination range where a noise tends to arise.

4. A knock determining device for an internal combustion engine according to claim 3, wherein
   the noise intensity determination means defines the noise intensity determination range in consideration of opening/closing timings of intake/exhaust valves.

5. A knock determining device for an internal combustion engine according to claim 3, wherein
   the noise intensity determination means defines the noise intensity determination range in consideration of a fuel injection timing.

* * * * *